THOMAS M. SEBESTYEN
INVENTOR

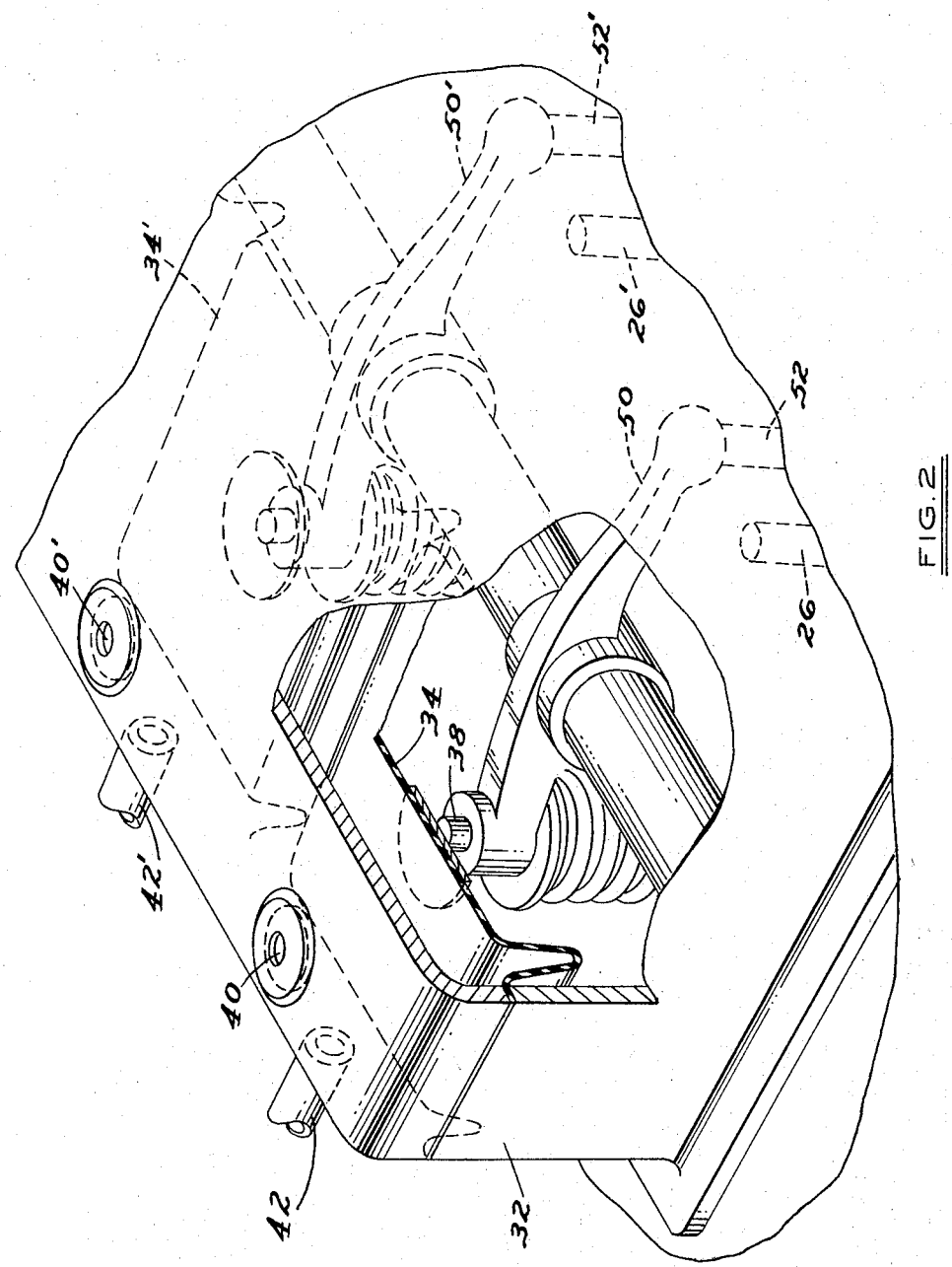

Dec. 26, 1967   T. M. SEBESTYEN   3,359,722
PUMP MEANS IN AN INTERNAL COMBUSTION ENGINE
Filed Jan. 24, 1966   3 Sheets-Sheet 3
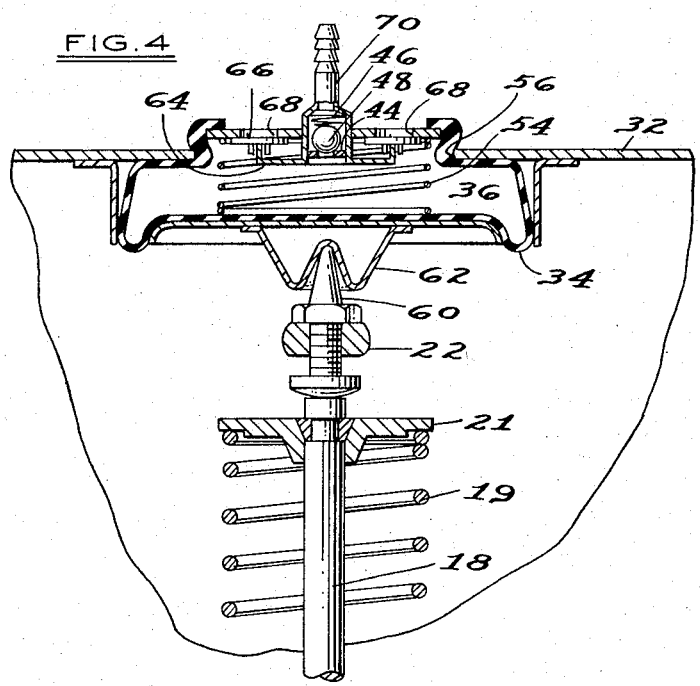
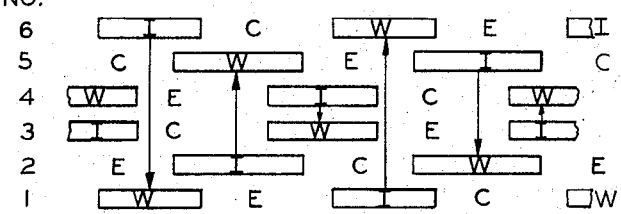
THOMAS M. SEBESTYEN
INVENTOR
BY John A. Faulkner
Robert E. McCollum
ATTORNEYS

United States Patent Office 3,359,722
Patented Dec. 26, 1967

3,359,722
PUMP MEANS IN AN INTERNAL
COMBUSTION ENGINE
Thomas M. Sebestyen, Ann Arbor, Mich., assignor to
Ford Motor Company, Dearborn, Mich., a corporation
of Delaware
Filed Jan. 24, 1966, Ser. No. 522,432
15 Claims. (Cl. 60—30)

ABSTRACT OF THE DISCLOSURE

A diaphragm cooperates with the engine valve cover to form a pump chamber located above one end of the rocker arm. A check valve mounted in the engine valve cover admits air to the pump chamber when that end of the rocker arm is pivoted away from the valve cover and another check valve located in appropriate tubing permits air to flow out of the chamber when the rocker arm pivots that end toward the valve cover. When the pump chamber is located above the valve end of the rocker arm operating an intake valve, the tubing can connect the pump chamber of one cylinder to the exhaust port of another cylinder selected so the charge of air from the chamber reaches the exhaust port just before the exhaust port opens. The charge of air then mixes with the exhaust gases to oxidize unburned hydrocarbons and thereby reduce undesirable exhaust emission.

---

This invention pertains to internal combustion engines having pump means therein, and particularly concerns an engine using the pump means to reduce the quantity of smog producing and other harmful materials in the exhaust gases.

Unburned hydrocarbons in engine exhaust gases are catalyzed by sunlight to form smog, which irritates eyes and respiratory systems of humans and harms vegetation. Exhaust gases also contain small amounts of carbon monoxide. Mixing air with the hot exhaust gases emerging from combustion chambers spontaneously starts oxidation of the hydrocarbons and the carbon monoxide if the temperature of the mixture is maintained above about 1200° F., the spontaneous ignition temperature. Once oxidation starts, the heat of combustion produced thereby aids in maintaining the mixture temperature above this minimum.

Belt driven air pumps have been used widely to supply air to the exhaust passages for this oxidation. These pumps are necessarily mounted near the front of the engine, and a considerable length of tubing is required to transmit the air to the exhaust passages. Furthermore, air is supplied continuously to the exhaust passages by these pumps even though it is only useful for oxidation while the exhaust gases are in the exhaust passages. Cooling caused by excess air reduces the efficiency of the oxidation process and can prevent its occurrence by reducing the mixture temperature below the spontaneous ignition temperature. Devices limiting the air supplied to the exhaust passages by the belt driven pumps increase material costs and assembly time.

The engine of this invention has a combustion chamber valve with means imparting operating motion thereto. A pump chamber is actuated by the operating means. Inlet means admits fluid to the pump chamber and outlet means provides an exit for the fluid. The combustion chamber valve can be mounted in an engine head member. A cover means is then mounted on the head member and a diaphragm means cooperates with the cover means to form a pump chamber.

Fluid pumped from the pump chamber can be used for numerous purposes. For example, when the fluid is air, it can be used in the engine induction system, in engine locations where cooling or heating is desired, or in the combustion chamber exhaust passages to oxidize harmful substances in the exhaust gases.

One of the most significant advantages of the engine of this invention is the lack of external drive mechanisms for the pump means. When the air from the pump means is used to oxidize undesirable materials in the exhaust gases, other advantages of the engine include the location of the pump means near the combustion chamber exhaust passages, the ease with which the air supply can be timed to mix with the exhaust gases, and the reduction in the amount of excess air.

Engines of this invention having multiple combustion chambers can have a pump means associated with each cylinder. Directing the air from each pump means in this multicylinder engine to the exhaust passages of a cylinder about to discharge exhaust gases provides an optimum combination of oxidation and engine efficiency.

FIGURE 1 of the drawings is a cross-sectional end view of the upper portion of an engine of this invention;

FIGURE 2 is a phantom view taken from above the valve cover of a multicylinder engine;

FIGURE 3 is an operation schedule of a six cylinder engine used to direct the output of each pump means to its optimum cylinder; and FIGURE 4 is a cross-sectional side view of a portion of an engine of this invention showing a valve cover having an integral pump chamber mounted therein.

Figure 1:
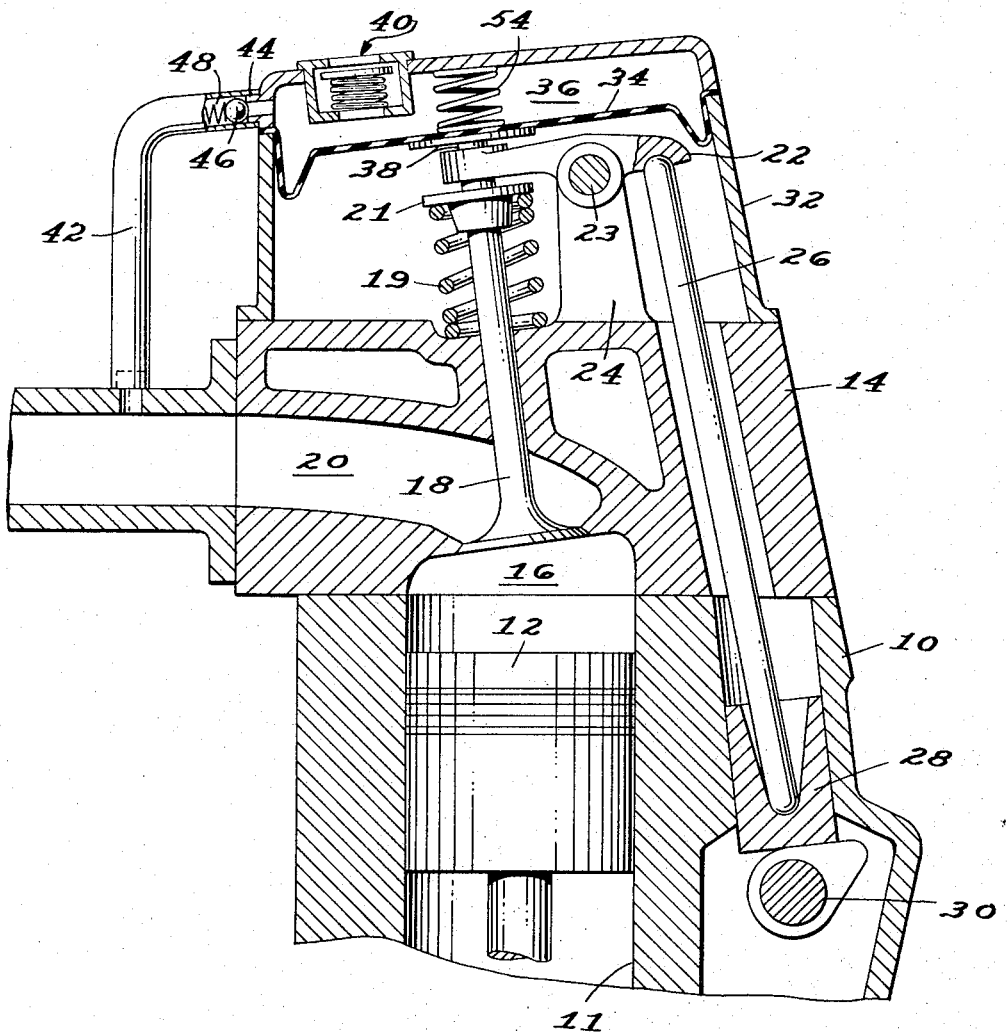

The engine shown in FIGURE 1 comprises an engine block 10 having a cylinder bore 11 which contains a piston 12. An engine head member 14 is mounted on block 10 to define a combustion chamber 16. Mounted in head member 14 is exhaust valve 18 opening chamber 16 to exhaust passage 20. A valve spring means 19 is mounted coaxially with valve 18 between head member 14 and retainer means 21. Rocker arm 22 pivots on shaft 23 which is mounted by support member 24 on head member 12. One end of rocker arm 22 engages exhaust valve 18 and the other end engages the upper end of pushrod 26. The lower end of pushrod 26 engages tappet 28 which rides on camshaft 30.

Mounted on top of head member 14 is valve cover 32. A flexible diaphragm 34 is bonded to cover 32 to form a pump chamber 36 with cover 32 immediately above rocker arm 22. Stud 38 mounted on one end of rocker arm 22 connects the rocker arm to flexible diaphragm 34. Inlet check valve 40 mounted in cover 32 provides an inlet means to pump chamber 36. Check valve 40 can be of the construction well known in the art and therefore is not described in detail. Tubing 42 provides an outlet from pump chamber 36 leading to exhaust passage 20. A check valve assembly comprising seat 44, ball 46, and spring 48 is mounted in tubing 42.

During the engine exhaust stroke, rotating camshaft 30 imparts upward motion to tappet 28 and pushrod 26. Pivoting on shaft 23, rocker arm 22 transmits the upward motion of pushrod 26 into downward motion of exhaust valve 18, opening the latter to allow gases to exhaust from combustion chamber 16 into passage 20. Valve spring means 19 returns valve 18 to its closed position when the nose of camshaft 30 passes tappet 28. Thus, tappet 28, pushrod 26, valve 18 and the ends of rocker arm 2 have reciprocating motion while rocker arm 22 has rocking motion.

The reciprocating motion of one end of rocker arm 22 is transmitted by stud 38 to diaphragm 34. When valve 18 opens by downward movement, air is drawn into chamber 36 through inlet check valve 40. Subsequently, when valve 18 closes by upward movement, rocker arm 22 pumps the air in pump chamber 36 past ball 46 through tubing 42 to exhaust passage 20.

FIGURE 2 shows a multicylinder internal combustion engine having the pump means described above associated with each cylinder. In FIGURE 2, exhaust valves and their rocker arms have been cut away for clarity and diaphragm 34 is shown operably engaged by intake valve rocker arm 50 which is actuated by pushrod 52. Engines of this invention can have these pump means associated with both the intake and the exhaust valves if desired. Stroke length of the pump means or the pump chamber volume can be adjusted to provide the desired amount of air.

By supplying air to exhaust manifold passages just before gases from the combustion chamber enter the passages, adequate mixing of the air with the gases to initiate and support oxidation occurs without a substantial increase in exhaust manifold back pressure, thereby optimizing oxidation efficiency with engine operating efficiency. In multicylinder engines, this is accomplished by transmitting air from the pump chamber of one cylinder to the exhaust manifold passage of a cylinder which is about to begin its exhaust stroke. FIGURE 3 is an operation schedule used to select the exhaust passage of the proper cylinder for each pump in a six cylinder engine having a firing order 1 5 3 6 2 4.

In FIGURE 3, portions marked I represent an intake stroke, C represents a compression stroke, W represents a work stroke, and E represents an exhaust stroke for cylinders numbered 1 through 6. It will be understood that throughout the latter half of each I portion, the intake valve of that cylinder is closing and a pump chamber associated with that intake valve is exhausting air. This air is desired in the exhaust passages of a combustion chamber which is about to begin its exhaust stroke, which is accomplished by connecting a pump chamber with an exhaust passage in accordance with the arrows shown in FIGURE 3. Thus, tubing 42 connects pump chamber 36 of cylinder 6 and exhaust passage 20 of cylinder 1; chamber 36 of cylinder 5 and passage 20 of cylinder 2; chamber 36 of cylinder 4 and passage 20 of cylinder 3; chamber 36 of cylinder 3 and passage 20 of cylinder 4; chamber 36 of cylinder 2 and passage 20 of cylinder 5; and chamber 36 of cylinder 1 and passage 20 of cylinder 6.

A spring means 54 shown in FIGURES 1 and 4 can be provided to maintain engagement of diaphragm 34 with rocker arm 22, thereby eliminating the need for stud 38 and simplifying assembly of valve cover 32 onto head member 12. In engines having an overhead camshaft, a diaphragm 34 is operably engaged by a lobe of the camshaft.

FIGURE 4 shows a construction which also simplifies assembly of the engine of this invention. In FIGURE 4, valve cover 32 has an opening 56 therein above one end of rocker arm 22. Wall 58 is assembled to diaphragm 34 to form an integral pump chamber 36 and the assembly is snapped into opening 56 where it and valve cover 32 define the engine head member cover means.

Adjustment assembly 60 threaded into the end of rocker arm 22 engages a receiving member 62 attached to the lower portion of diaphragm 34. Foil spring 64 supports annular disc 66 at the interior side of inlet holes 68 in wall 58. Ball 46 is held on seat 44 by spring 48 in outlet passage 70. Spring 54 is mounted between wall 58 and the lower portion of diaphragm 34.

Spring 54 urges the lower portion of diaphragm 34 downward when rocker arm 22 moves downward. The movement draws air past disc 66 into chamber 36. Upward movement of rocker arm 22 and the portion of diaphragm 34 pumps the air past ball 46 into outlet passage 70.

What is claimed is:
1. An internal combustion engine which comprises
 a combustion chamber valve mounted in an engine head member,
 operating means imparting operating motion to said valve,
 cover means mounted on said head member,
 diaphragm means forming a pump chamber with said cover means, said diaphragm means having reciprocating motion imparted thereto by said operating means,
 inlet means to said pump chamber, and
 outlet means from said pump chamber.
2. The engine of claim 1 in which the outlet means communicates with the combustion chamber exhaust passage.
3. The engine of claim 2 in which the inlet means comprises a check valve mounted in the cover means.
4. The engine of claim 3 in which the check valve is open to the atmosphere and the pump chamber pumps air from the atmosphere to the exhaust passage.
5. The engine of claim 4 in which the operating means is a rocker arm.
6. An engine of claim 5 which has multiple combustion chambers with the outlet means from the pump chamber associated with one cylinder communicating with the exhaust passage of another cylinder.
7. The engine of claim 1 in which the cover means comprises a valve cover having an opening therein closed by a wall forming the exterior of the pump chamber.
8. The engine of claim 7 in which the inlet means and outlet means are mounted in said wall.
9. An engine of claim 8 which has multiple combustion chambers with the outlet means from the pump chamber associated with one cylinder communicating with the exhaust passage of another cylinder.
10. The engine of claim 1 in which the inlet means comprises a check valve mounted in the cover means.
11. The engine of claim 1 in which the operating means comprises a rocker arm.
12. An engine of claim 1 which has multiple combustion chambers with the outlet means from the pump chamber associated with one cylinder communicating with the exhaust passage of another cylinder.
13. An internal combustion engine which comprises
 a combustion chamber valve,
 operating means imparting operating motion to said valve, a cover for said operating means, said cover having an opening therein,
 pump chamber means actuated by said operating means, said pump chamber means being mounted in said opening in said cover,
 inlet means admitting air to the pump chamber means and
 outlet means removing air from the pump chamber means.
14. The engine of claim 13 in which the operating means is a rocker arm.
15. The engine of claim 14 in which the outlet means communicates with the combustion chamber exhaust passage.

References Cited

UNITED STATES PATENTS

| | | | |
|---|---|---|---|
| 2,955,582 | 10/1960 | Taylor | 123—119 |
| 3,065,595 | 11/1962 | Gary | 60—30 |
| 3,147,588 | 9/1964 | Tauschek | 60—30 |

RALPH D. BLAKESLEE, *Primary Examiner.*